Nov. 20, 1962    V. L. COLT ETAL    3,064,745
POWERED DIRIGIBLE WHEEL UNIT
Filed Jan. 18, 1960    3 Sheets-Sheet 1
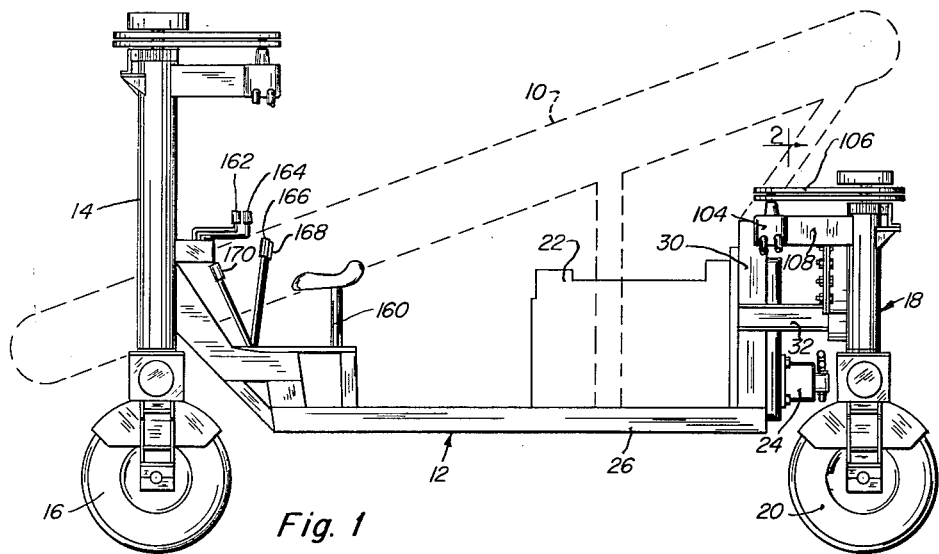
Fig. 1
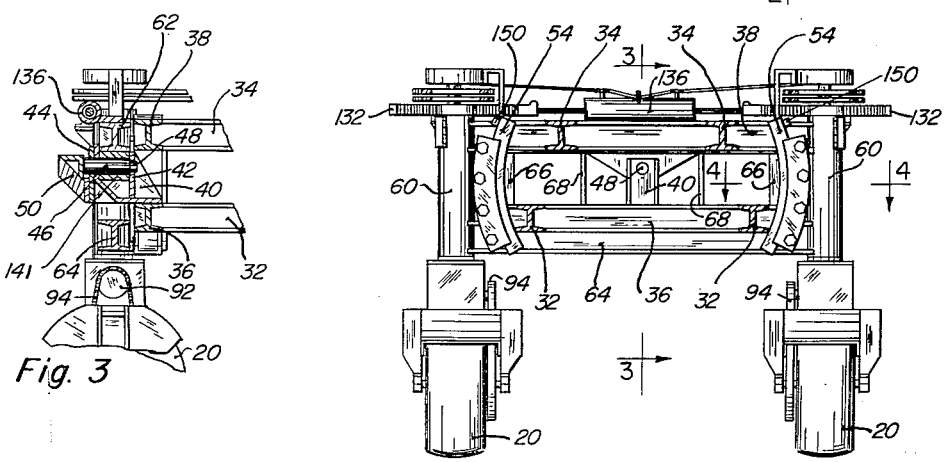
Fig. 2
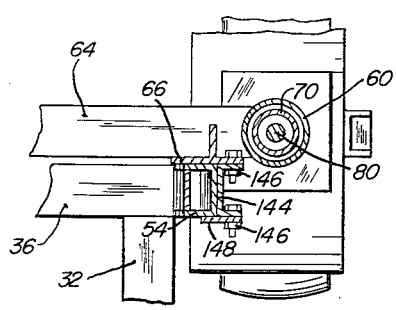
Fig. 3
Fig. 4
INVENTORS
VICTOR L. COLT
CHARLES B. WILLOCK
BY
Buckhorn, Cheatham & Blore
ATTORNEYS

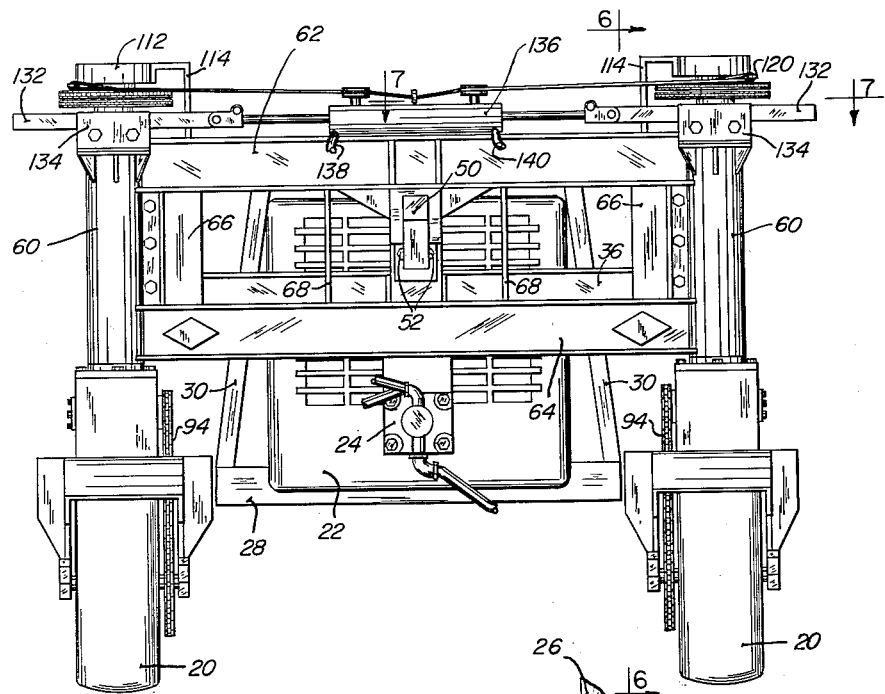
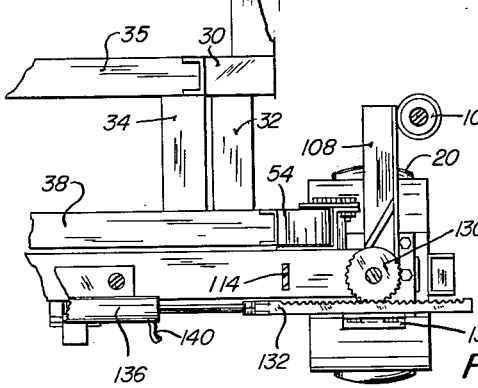

INVENTORS
VICTOR L. COLT
CHARLES B. WILLOCK
BY Buckhorn, Cheatham & Blore
ATTORNEYS 3,064,745
Patented Nov. 20, 1962

3,064,745
POWERED DIRIGIBLE WHEEL UNIT

Victor L. Colt and Charles B. Willock, Portland, Oreg., assignors to The Peters Company, Portland, Oreg., a partnership consisting of Dora H. Peters and Victor L. Colt Filed Jan. 18, 1960, Ser. No. 2,971
4 Claims. (Cl. 180—6.24)

The present invention relates to a wheeled vehicle and more particularly to a new and improved wheel unit for powered dirigible wheels.

It is an object of the present invention to provide a new and improved mounting arrangement for a powered dirigible wheel.

Another object is to provide a simple but rugged arrangement for securing an assembly of a pair of dirigible wheels to the frame of a vehicle to permit the wheels to meet irregularities of the supporting surface.

A further object of the invention is to provide a simple and effective arrangement for steering a pair of powered dirigible wheels.

A still further object is to provide a vehicle having four, individually powered dirigible wheels over which control may be easily maintained.

Still another object is to provide a four wheeled vehicle which can be moved in any direction.

Another object is to provide a four wheel vehicle which can be turned in a circle of a diameter no greater than the length of the vehicle.

Still other objects and advantages of the invention will become more apparent hereinafter.

In accordance with the illustrated embodiment, the present invention comprises a wheel assembly including two opposite vertical tubular columns in each of which is mounted a steering shaft. The shafts are suitably connected together to obtain simultaneous rotation for steering control. The wheels are each individually driven through suitable motor means mounted on the column of a wheel and drivingly connected to a drive shaft which extends through the steering shaft of each wheel assembly.

For a more detailed description of the invention, reference is made to the accompanying drawings wherein:

FIG. 1 is a side elevation of a vehicle constructed in accordance with the invention;

FIG. 2 is a sectional view taken substantially along line 2—2 of FIG. 1;

FIG. 3 is a sectional view taken substantially along line 3—3 of FIG. 2;

FIG. 4 is an enlarged sectional view taken substantially along line 4—4 of FIG. 2;

FIG. 5 is an elevation of one end of the vehicle;

FIG. 6 is a sectional view taken along line 6—6 of FIG. 5;

FIG. 7 is a sectional view taken along line 7—7 of FIG. 5;

Figure 9:
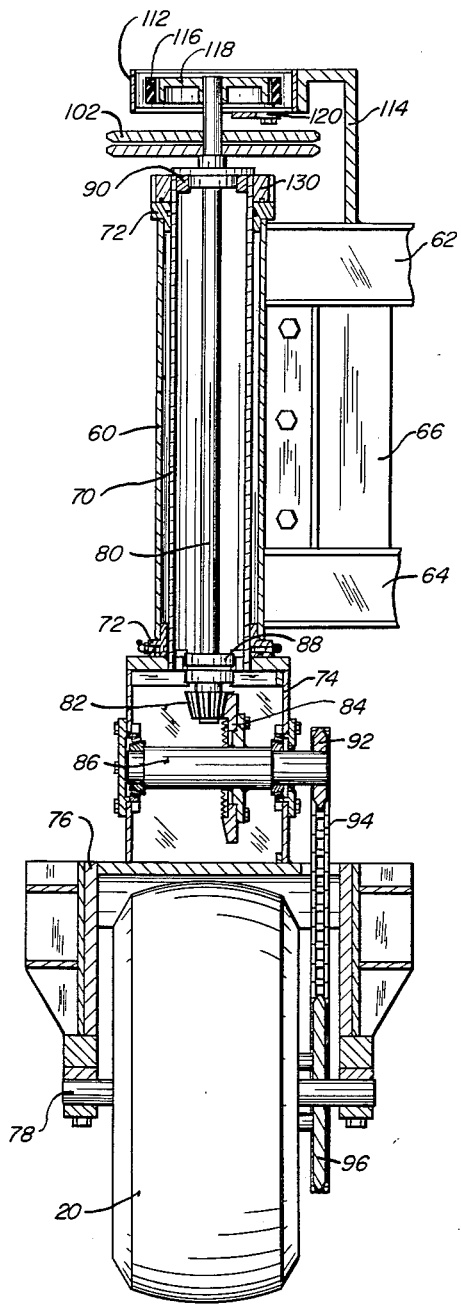
FIG. 9 is a sectional view taken substantially along line 9—9 of FIG. 8.

As will become readily apparent hereinafter, the wheel assemblies of the invention may be utilized in vehicles of various types. In the present application, the invention is illustrated in connection with a vehicle for supporting a conveyor indicated generally by dotted lines at 10 in FIG. 1 and which may be suitably supported from the frame 12 of the vehicle. The conveyor and its supports form no part of the present invention and, therefore, are not shown or described in detail. The frame 12 is fixedly secured at one end to the wheel assembly 14 of a pair of front wheels 16 and is supported at its other end by an assembly 18 of a pair of rear wheels 20. Mounted on the frame is a motor 22 which is suitably connected to provide power for the conveyor 10 and is also connected to drive a hydraulic pump 24 which provides power for the wheels 16, 20 as will be described hereinafter.

The frame 12 includes a pair of opposite longitudinal frame members 26 which are connected together adjacent the rear wheels 20 by a cross member 28, as may be seen in FIG. 5. Converging upwardly from the ends of the member 28 are a pair of side frame members 30 to which are secured rearwardly projecting pairs of frame members 32, 34 (FIG. 3). A member 35 extends between the members 30 at their upper ends. To the ends of the lower frame members 32 is secured a transverse I-beam 36 and to the ends of the members 34 is secured a transverse I-beam 38, as best shown in FIGS. 2 and 3. Mounted on the beam 36 is a yoke 40 which projects rearwardly of the beams 36, 38 and comprises two vertical parallel plates 42, 44 which support a pivot pin 46 provided with a reduced end portion 48 which fits within a cooperative opening in the plate 42 as may be seen in FIG. 3. The shoulder defined by the reduced portion 48 abuts against the plate 42. The opposite end of the pin 46 projects outwardly through a cooperative opening in the plate 44 and is engaged by a stop 50 removably secured to the mount 40 by suitable means such as by bolts 52 shown in FIG. 5. Secured to the ends of the beams 36, 38 is a pair of opposite, arcuate guide members 54 which are concentric with the axis of the pin 46. The purpose of the guide members 54 and the pin 46 will be made more apparent hereinafter.

Figure 8:
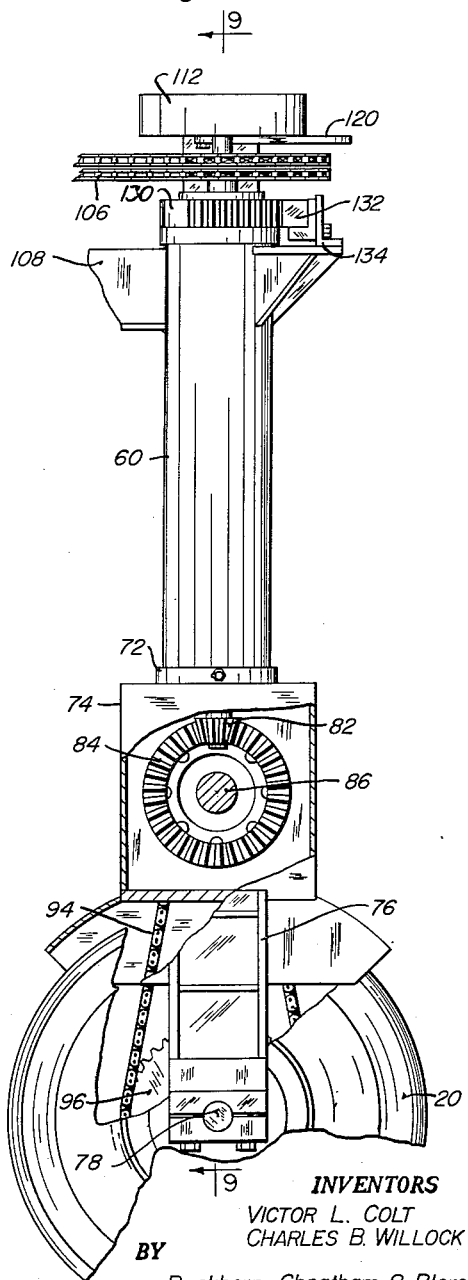
FIG. 8 is an enlarged fragmentary view of one of the wheel mounts partially broken away to show details thereof.

Referring now to FIG. 5, the wheel assembly 18 comprises a pair of wheel units each including a vertical, tubular column 60 which is welded to the opposite ends of a pair of vertically spaced beams 62, 64 constituting a subframe which may be braced at their ends by means of a pair of T-plates 66 secured to and extending between the beams. Further bracing members 68 may be provided between the beams 62, 64. The columns 60 form the direct supports for the wheels 20 and since the supporting arrangements for each of the wheels 20 is substantially identical, the arrangement thereof will be particularly described with reference to only one of the wheels and with particular reference to FIGS. 8 and 9. Mounted within a column 60 is a steering shaft 70 which is rotatable relative to the column 60 within bearings 72. Secured to the lower end of the shaft 70 is a gear housing 74 to which in turn is secured a clevis type hanger 76 which supports an axle 78 upon which the wheel 20 is rotatably journaled. Mounted coaxially within the steering shaft 70 is a drive shaft 80 which extends downwardly into the gear box 74 and has fixed to its lower end a bevel gear 82 which meshes with a bevel gear 84 fixed to a horizontal gear shaft 86 journaled in the housing 74. The shaft 80 is rotatably mounted in the top of the housing 74 by a bearing 88 and is rotatably supported at the top end of the steering shaft 70 by means of a bearing 90. One end of the shaft 86 projects outwardly of the gear housing 74 and has fixed thereto a sprocket 92 over which is trained a chain 94 that is also trained over a sprocket 96 fixed to the wheel 20. The drive shaft 80 extends above the upper end of the steering shaft 70 and has fixed thereto a sprocket 102. Suitable motor means are provided for driving the shaft 80 and which in the illustrated embodiment of the invention comprises a hydraulic motor 104, see FIG. 1, provided with a driving sprocket engaging a chain 106 which is in engagement with the sprocket 102. The motor 104 is mounted upon an arm 108 fixed to and extending from the column 60. Brake means is provided for such wheel and which in the present embodiment comprises a brake housing 112 supported on an arm 114 fixed as by welding to the beam 62. The housing 112 provides support for a brake band 116 arranged about a drum 118 fixed to the upper end of the drive shaft 80. Suitable means including an actuating lever 120 is provided for tightening the band 116 about the drum 118.

Means are provided for rotating the steering shaft 70 and which in the present embodiment includes a pinion 130 fixed to the upper end of the steering shaft 70 and engaged by a rack 132 sliding within an adjustable guide 134. The racks of the opposite wheels 20 are connected to the piston of a hydraulic cylinder 136 which may be supplied with hydraulic fluid through connections 138, 140 at its opposite ends to effect movement of the piston. As will be apparent, such movement of the piston will correspondingly move the racks 132 to effect simultaneous turning of the steering shafts 70 and wheels 20 therewith.

The wheel assembly 18 is tiltably mounted upon the rear end of the tractor to permit the wheels to elevate or lower with respect to the ground or to each other to adjust to various irregularities in the ground level. Referring now to FIG. 3, secured to the beam 62 is a bushing or journal 141 which is adapted to be received between the members 42, 44 of the yoke 40 and to receive in turn the pivot pin 46. Cooperatively arranged with each of the guide members 54 is a guide means including as one guide element the T-plate 66 on the corresponding side and against which one side of the guide member 54 abuts. The arcuately curved surface of the guide member 54 is engaged by another guide element consisting of a complementary curved U-shaped member 144 secured by bolts 146 to the plate 66. Abutting the other side surface of the guide member 54 is a third guide element consisting of a retaining plate 148 secured by bolts 146 to the opposite flange of the member 144. As will be apparent if one of the wheels 20 hits an obstacle causing the wheel to raise, the assembly will pivot about the axis of the pivot pin 46 with the guide elements sliding about the guide members 54. Stops 150 may be provided on each of the guide members 54 to limit the tilting movement.

The individual assembly for each of the front wheels 16 is substantially identical to that described hereinbefore. However, in the illustrated embodiment, the columns 14 for the front wheels 16 are fixedly secured to the frame 12 and may be suitably braced laterally. The columns 14 are of greater height than the columns for the rear wheels to provide clearance for the lower end of the conveyor 10 and to provide visibility for the operator seated upon the seat 160. Preferably the front wheels 16 will be connected for simultaneous turning movement similar to the rear wheels 20.

Suitable controls are provided for controlling the movement of the vehicle including levers 162, 164 for steering the front wheels 16 and rear wheels 20, respectively. Directional levers 166, 168 for operating the motors 104 to drive the vehicle forwardly or rearwardly as desired and a brake operating lever 170 can be suitable connected to the levers 120 for operating the brakes. Since suitable hydraulic systems for connecting the pump 24 to the various hydraulic motors will be obvious to those skilled in the art, no detailed description of such a system is deemed necessary.

As will be apparent, the provision of individual motor means on each of the wheels is of distinct advantage should any of the wheels encounter conditions causing it to lose traction. The tilting mount of the rear wheel assembly 18 will enable the vehicle to maintain engagement of all four wheels with the ground surface at all times, the advantage of which will be readily apparent.

It will also be obvious that the vehicle can be moved in any direction. By proper control over the direction of the wheels and power applied thereto, the operator can cause the vehicle to move forwardly or rearwardly, sidewise in either direction, or "crabwise." Furthermore, by turning the wheels sidewise and applying power in opposite directions to the front and rear wheels the machine can be caused to pivot or turn in its own length.

Having illustrated and described a preferred embodiment of the invention, it should be apparent to those skilled in the art that the invention permits of modification in arrangement and detail. I claim as my invention all such modifications as come within the true spirit and scope of the appended claims.

We claim:

1. In a vehicle, a frame, a wheel assembly at one end of said frame comprising a pair of laterally spaced, vertical, tubular columns and means rigidly connecting said columns, a pair of steering shafts, each shaft extending through a corresponding one of said columns and rotatable therein, a pair of wheels, means mounting said wheels one in the lower end of each of said steering shafts so that rotation of said shafts controls the direction of said wheels, means operatively connected with said steering shafts simultaneously to rotate the same, means pivotally mounting said assembly on said frame end for pivotal movement of said assembly about a horizontal axis disposed longitudinally of said vehicle, an engine mounted on said frame, a fluid pump mounted on said frame and driven by said engine, a pair of fluid motors each mounted on one of said columns, fluid connections between said fluid pump and each of said fluid motors for driving said fluid motors in either direction, control means on said frame for controlling the operation of said fluid motors, and driving means connecting each one of said motors to the one of said wheels associated with the column on which the motor is mounted for application of power to said wheels independently of each other.

2. In a vehicle, a frame, a first wheel assembly at one end of said frame comprising a first pair of laterally spaced, vertical, tubular columns and means rigidly connecting said columns, a first pair of steering shafts, each shaft extending through a corresponding one of said first pair of columns and rotatable therein, a first pair of wheels, means mounting each of said first pair of wheels one in the lower end of a corresponding one of each of said first pair of steering shafts so that rotation of said shafts controls the direction of said wheels, means operatively connected with said first pair of steering shafts simultaneously to rotate the same, means pivotally mounting said first wheel assembly on said frame end for pivotal movement of said assembly about a horizontal axis located centrally of and extending longitudinally of the vehicle, a second wheel assembly at the other end of said frame comprising a second pair of laterally spaced, vertical tubular columns and means rigidly connecting said columns, a second pair of steering shafts, each of said second steering shafts extending one through a corresponding one of said second pair of columns and rotatable therein, a second pair of wheels, means mounting each of said second pair of wheels in the lower end of a corresponding one of each of said second steering shafts so that rotation of said second steering shafts controls the direction of said second wheels, means operatively connected with said second steering shafts simultaneously to rotate the same, means fixedly mounting said second wheel assembly on said other frame end, an engine mounted on said frame, a fluid pump mounted on said frame and driven by said engine, four fluid motors each mounted on one of said columns, fluid connections between said fluid pump and each of said fluid motors for driving said fluid motors in either direction, control means on said frame for controlling the operation of said fluid motors, and driving means connecting each one of said motors to the one of said wheels associated with the column on which the motor is mounted for application of power to said wheels independently of each other, said control means comprising means controlling the operation of said pairs of wheels independently of each other.

3. In a vehicle, main frame means,
a pair of laterally spaced vertical columns,
rigid subframe means rigidly connecting the columns to one another,
a pair of wheels,
wheel-mounting means mounted pivotally in the columns and mounting the wheels at the lower ends of the columns,
steering means for turning the wheel-mounting means in the columns,
a pair of drive trains extending through the columns and drivingly engaging the wheels,
motor means mounted on the subframe means for driving the drive trains,
a power source mounted on the main frame means,
flexible connecting means connecting the power source and the motor means,
control means on the main frame means for controlling the supply of power from the power source to the motor means,
central pivot means connecting the subframe means to the main frame means for pivotal movement of the subframe means relative to the main frame means about a horizontal axis disposed longitudinally of the vehicle and supporting the main frame on the subframe means,
first arcuate guide means spaced radially outwardly from the central pivot means and connected rigidly to the main frame means,
and second arcuate guide means connected rigidly to the subframe means and the columns and mounted in concentric sliding relationship to the first arcuate guide means, the first and second arcuate guide means having interlocking portions transmitting between the main frame means and the subframe means forces in directions generally parallel to said axis.

4. The vehicle of claim 3 in which the second arcuate guide means are mounted on the columns.

References Cited in the file of this patent
UNITED STATES PATENTS

| | | |
|---|---|---|
| 867,282 | MacFarren | Oct. 1, 1907 |
| 1,032,903 | Hettrich | July 16, 1912 |
| 1,234,148 | Fisher | July 24, 1917 |
| 1,276,250 | Mueller | Aug. 20, 1918 |
| 1,318,894 | Mapes | Oct. 14, 1919 |
| 1,635,236 | Tolson | July 12, 1927 |
| 1,777,109 | Stokes et al. | Sept. 30, 1930 |
| 2,232,549 | McNamara | Feb. 18, 1941 |
| 2,376,419 | Cole | May 22, 1945 |
| 2,400,505 | Hedglen | May 21, 1946 |
| 2,500,081 | Laurent | Mar. 7, 1950 |
| 2,644,540 | Blazer | July 7, 1953 |
| 2,779,425 | Miller | Jan. 29, 1957 |
| 2,840,389 | Page | June 24, 1958 |